(12) United States Patent
O'Hara

(10) Patent No.: US 6,787,045 B1
(45) Date of Patent: Sep. 7, 2004

(54) MIXING, AERATION OR OXYGENATING METHOD AND APPARATUS

(76) Inventor: Kenneth O'Hara, Pen-yr-allt Farm House, Lake Road, Padeswood Mold, Flintshire (GB), CH7 4H7

( * ) Notice: Subject to any disclaimer, the term of this patent is extended or adjusted under 35 U.S.C. 154(b) by 0 days.

(21) Appl. No.: 09/914,706
(22) PCT Filed: Mar. 3, 2000
(86) PCT No.: PCT/GB00/00721
§ 371 (c)(1), (2), (4) Date: Aug. 31, 2001
(87) PCT Pub. No.: WO00/53534
PCT Pub. Date: Sep. 14, 2000

(30) Foreign Application Priority Data

Mar. 5, 1999 (GB) .............................................. 9904946

(51) Int. Cl.⁷ .................................................. C02F 3/00
(52) U.S. Cl. .................. 210/739; 210/97; 210/136; 210/150; 210/194; 210/221.2
(58) Field of Search .................... 210/739, 97, 136, 210/150, 194, 221.2

(56) References Cited

U.S. PATENT DOCUMENTS

| 3,293,861 A | 12/1966 | Hinde |
| 3,651,646 A | 3/1972 | Grunau |
| 3,847,178 A | 11/1974 | Keppel |
| 4,960,546 A | 10/1990 | Tharp |
| 5,184,641 A | 2/1993 | Kuhn |
| 6,475,395 B1 * | 11/2002 | Schmit et al. .............. 210/741 |

FOREIGN PATENT DOCUMENTS

GB 2 326 603 A 12/1998

* cited by examiner

Primary Examiner—Chester T. Barry
(74) Attorney, Agent, or Firm—Ware, Fressola, Van der Sluys & Adolphson LLP

(57) ABSTRACT

A mixing, aerating or oxygenating method and apparatus to aerate or oxygenate ponds, rivers or lakes, sewage or effluent treatment lagoons or beds or to airstrip volatile compounds from water or other solutes by distributing gas through a piped system having a plurality of outlets (4) branching from a common distribution line (2). In order to deliver a desired quantity of air or oxygen at each outlet, a constant flow regulator (5) is disposed in each outlet which limits the flow to a set amount when the pressure in the pipe system exceeds a predetermined minimum value. In one method, the regulator is chosen to achieve this irrespective of pressure drop along the distribution line. In another method, the regulator is chosen to give the desired output with no pressure drop along the distribution line.

20 Claims, 1 Drawing Sheet

MIXING, AERATION OR OXYGENATING METHOD AND APPARATUS

BACKGROUND OF THE INVENTION

1. Technical Field

The present invention relates to a method and apparatus for regulating the distribution of gaseous fluids and in particular to a mixing, aerating or oxygenating method and apparatus to aerate or oxygenate ponds, rivers, estuaries, reservoirs or lakes, sewage or effluent treatment lagoons or beds or tanks or to airstrip volatile compounds from water or other solutes.

2. Description of the Background Art

There are many situations where submerged diffusers are used to introduce gas into a liquid. For example to transfer oxygen into a liquid (typically water) for the purposes of aeration and mixing, and especially to oxygenate the water. Such techniques are used in aerobic biological treatments systems as used to treat sewage, effluents of various types, and storm water and water in aquaria or lakes and rivers, among others. They are also used for air stripping of volatile organics from contaminated water.

It is common to treat sewage in "activated sludge treatment plants" by feeding precise volumes of air to a plurality of diffusers which release the air into the water in precise small bubbles to stimulate natural processes. The number of diffusers and hence the spacing is calculated relative to the volume of water to be treated and the amount of treatment required. The diffusers are usually placed at the lowest point in the water column allowing the most time for air to pass through the water prior to reaching the atmosphere.

In the known systems, a plurality of diffusers are fed from a supply line, usually from a suitable air source such as an air pump, which delivers a constant and even supply of air. The diffusers are disposed in series along the supply line and the quantity of air emerging from each diffuser is intended to be substantially the same. In the known sewage treatment systems, potential pressure drop along the line from one diffuser to the next is rendered negligible by utilizing a supply pipe having a large cross-sectional area and a relatively low-pressure supply. The cross-section of the pipe has to be calculated having regard to the number of diffusers and the discharge rate in order to ensure that there is a negligible pressure drop along the length of the pipe and thereby ensure that the flow from the diffusers is balanced. In other specific aeration systems a manually adjustable valve or orifice control may be provided for each diffuser to balance their output. The known system of individually balanced gas diffusers is difficult to set up to ensure correct balance, usually requiring accurate levelling of the outlet diffusers.

A constant flow regulator and a method of manufacturing same comprising a moving "O" ring is described in Patent Nos. EP 115342 and GB 2136713. The described regulator gives a constant through volume flow rate of liquid over a wide range of supply pressures. A regulator of this type can be designed to produce a specific flow rate over a prescribed pressure range and can be molded from plastics which makes them extremely economical to produce. When a plurality of such constant flow devices are fitted in series in a pipeline supplied with liquid at a sufficiently high pressure, the flow rate is constant from each regulated line irrespective of the pressure fluctuations along the pipeline(s) of the system. The supply line pressur has to be above a predetermined minimum level at the point wh re the pressure drop is highest. Usually this will be at the end of the pipeline. The use of these devices has not been considered to regulate the flow of air or oxygen. There is no teaching to use these devices with fluids other than liquids. The reason for this may be that none of the commercially available devices have been deemed able to operate to produce constant flow with fluctuating air pressure.

SUMMARY OF THE INVENTION

It is an aim of the present invention to provide a gas distribution system which overcomes the current difficulties.

One aspect of the invention provides a method of distributing gas through a piped system having a plurality of outlet lines branching from a common supply line or manifold, the method comprising continuously generating a predetermined minimum volume of gas and introducing it into the pipe system, delivering a desired quantity of gas at each of the outlets by providing a constant flow regulator means in each outlet line which limits the flow to a set amount when the pressure in the pipe system exceeds a predetermined minimum value.

More particularly, the present invention provides a method of mixing, aerating or oxygenating ponds, rivers or lakes, sewage/treatment lagoons or effluent beds or air striping volatile compounds from water or other solutes, the method comprising distributing air or oxygen through a pipe system having a plurality of outlet lines branching from a common supply line or manifold, by continuously generating a predetermined minimum volume of air or oxygen and introducing it into the pipe system, delivering a desired quantity of the air or oxygen at each of the outlets by providing a constant flow regulator means in each outlet line which limits the flow to a set amount when the pressur in the pipe system exceeds a predetermined minimum value.

For the aforementioned applications the gas as referred to hereinafter will be air or oxygen.

More particularly the predetermined minimum volume of gas exceeds a calculated minimum volume which is required to be delivered by the diffusers. Preferably a moving element control flow regulator is chosen to achieve this irrespective of pressure drop along the pipe, at least within a pressure range which is deemed acceptable. For most applications an accurate and even quantity of gas is delivered at each outlet. This can be achieved using constant flow regulators having a specific and even flow rating for each outlet.

Another aspect of the present invention provides a gas distribution system comprising a gas distribution supply line, a source of gas pressure connected to the distribution supply line, and a plurality of outlet lines branching from the distribution supply line, and characterized by a constant flow regulator disposed between the distribution supply line and each outlet line to cause a desired flow of gas to be delivered through the outlet lines.

More particularly, the present invention provides a mixing, aeration or oxygenation system to aerate or oxygenate ponds, rivers, estuaries, reservoirs or lakes, sewage or effluent treatment lagoons or beds or to airstrip volatile compounds from water or other solutes and comprising an air or oxygen distribution supply line, a source of pressurized air or oxygen connected to the distribution supply line, and a plurality of outlet lines branching from the distribution supply line, and characterized by a constant flow regulator disposed in each outlet line to cause a desired flow of air or oxygen to be delivered through the outlet lines.

For the aforementioned application the gas referred to herewith will be air or oxygen. There may be more than one distribution line.

More particularly a predetermined minimum volume of gas is supplied, which volume is calculated to exceed the minimum volume which is to be delivered from the diffusers. The desired flow of gas is a desired even flow of gas.

The constant flow regulator may be a moving "O" ring constant flow regulator or other moving element constant flow regulator which is precisely tuned to deliver the desired calculated supply of gas required at the outlet line irrespective of changes in supply pressure such that it is self compensating for changes in supply pressure within its designed operating range.

In an alternative, a moving "O" ring regulator is used that only allows a desired maximum flow (volume) of gas to pass through above a known pressure of gas. Using such a regulator, pressure drops along the pipeline can be compensated for by using a regulator which has the desired maximum flow at a lower pressure to reflect the pressure drop. By this means a substantially even flow of gas is achieved from all the outlets. It will be understood that when the term even is used, there will most usually be an acceptable tolerance variation to the desired flow rate.

Each outlet has a suitable outlet nozzle. They may be aeration nozzles, diffusers or any other suitable nozzle for the intended application. In a preferred application each outlet supplies a respective diffuser. Conveniently the outlets are disposed in series along the distribution supply line. The number of outlets and hence outlet nozzles/diffusers are calculated and spaced according to the particular application. Preferably the gas originates from a suitable source, usually generated by a pump gas blower or generator or other suitable device, and preferably it delivers a constant volume of gas. The system can be used for distributing any desired gas composition. For many applications, the gas will be air but other gases could be used such as oxygen, carbon dioxide, nitrogen or ozone. The distribution supply line comprises at least one length of pipe. As an alternative it may comprise a plurality of lengths of pipe branching from a common manifold or having a direct connection with the supply of gas. The pipeline may include a r turn line or be of ring main type. The outlet lines may incorporate a backflow regulation device and/or an isolation ball valve. Such devices may incorporate the aforesaid constant flow regulator or be provided as separate devices. The constant flow regulator, any backflow regulation device and any isolation valve may be combined with an outlet diffuser.

The invention can be used for a large number of potential applications, for example the treatment sewage, leachate and agricultural waste water by the introduction of air, air stripping of volatile compounds from water or other solutes, mixing water columns, aerating and mixing of aquaria, ponds, lakes and rivers or tanks containing fish, and in connection with various industrial processes. Where the system is used for the purpose of introducing gas into a liquid or other gas, the backflow prevention device avoids the liquid or gas entering the system should the system enter a state of relative negative pressure. The isolation ball valve allows individual branches to be isolated. The system can be used to control a bubble curtain.

For any given application the delivery rate from the outlets will be known and the source of gas will be capable of maintaining a constant supply of no less than the calculated minimum requirement for the system.

The present invention may be used for any of the above mentioned applications and any other applications in which gas, and in particular air or oxygen is to be transferred to a liquid.

BRIEF DESCRIPTION OF THE DRAWING

The present invention will now be described further hereinafter, by way of example only, with reference to the accompanying drawings; in which.

DETAILED DESCRIPTION OF THE INVENTION

Figure 1:
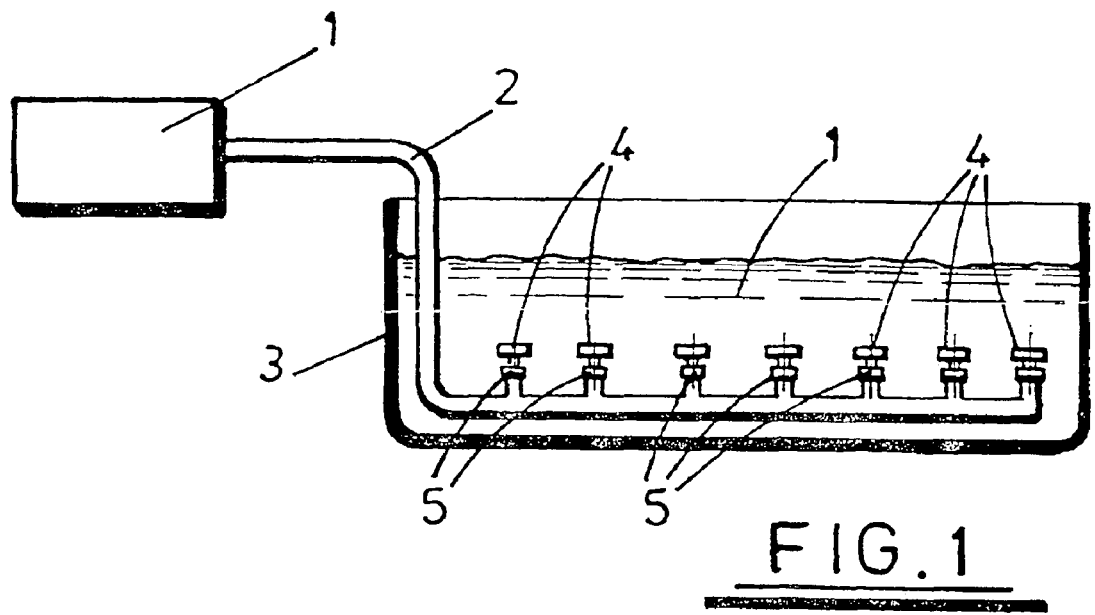
FIG. 1 shows schematically one embodiment of air distribution system embodying the present invention.

For convenience the present invention is described by way of example in relation to the treatment of water by the injection of air. In one application for waste treatment, the water will contain effluent. The water/effluent to be treated is shown at $1a$ and held within an open well or receiver 3. An air distribution pipeline 2 extends from a source of air $1b$ which supplies the air under pressure to the pipeline 2. A motor driven pump (not illustrated) conveniently serves this purpose. The pipeline 2 has a plurality of outlets 4 disposed along the length thereof at spaced intervals. For the purpose of effluent treatment, each outlet 4 is provided with a diffuser which releases the air into the water/effluent $1a$ in the form of small bubbles. In order to ensure that the flow of air from each diffuser is the same, a regulator 5 is incorporated into the flow line between the pipeline 2 and each of the outlets 4. The regulator 5 may be part of the diffuser or a separate component. The regulator 5 is designed to deliver a constant flow irrespective of pressure variations in the pipeline 2 when the pressure in the pipeline 2 exceeds a predetermined minimum value, which minimum value is calculated to be that which will ensure that each regulator 5 supplies the desired volume of gas. The preferred regulator device is of a type known as a moving element constant flow regulator such as described in the above mentioned patents. These are very economical to produce, especially when molded from plastics.

Figure 2:
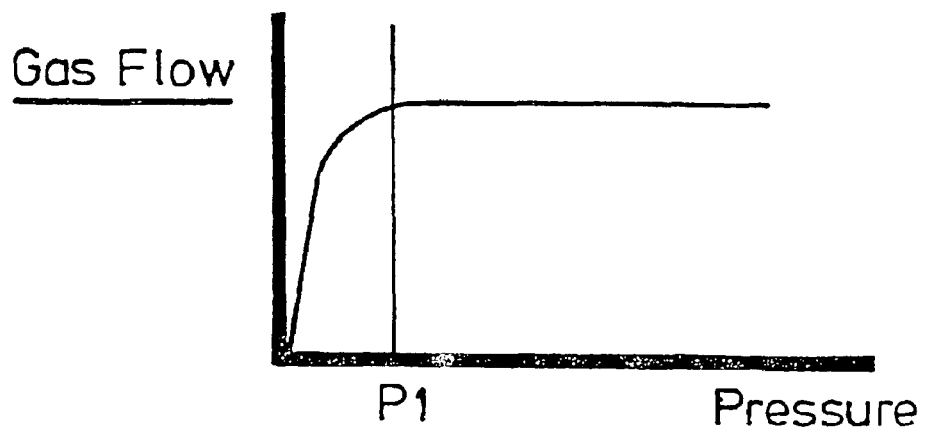
FIG. 2 is a graph of flow rate against pressure for a preferred pressure regulator.

The preferred moving element constant flow regulator is designed to operate to deliver a desired flow of air over a range of supply pressures. That is to say it is self-compensating for changes in supply pressure over a prescribed range of pressures above a minimum pressure level. FIG. 2 is a graph of a regulator of moving element type having characteristics of the described type and shows flow volume against pressure. It shows how the flow rate plateaus after pressure P1. Using a plurality of flow regulators 5 in a distribution supply line will give rise to an even delivery of air from the plurality of diffusers providing the pressure in the pipeline exceeds the minimum threshold value P1.

In an alternative, using an "O" ring type regulator, the regulator only allows a set maximum flow (volume) of air to pass through at a given pressure of air providing the pressure in the system does not exceed that given pressure, then the flow rate from each outlet line will be at the set maximum flow rate, and a regulator is chosen which provides the desired flow rate for a particular application. This can be used where there is little or no pressure drop along the distribution line.

What is claimed is:

1. A method of mixing, aerating or oxygenating ponds, rivers or lakes, sewage/treatment lagoons or effluent beds or air striping volatile compounds from water or other solutes, the method comprising the steps of:

(a) providing a pipe system having a plurality of outlets branching from a common distribution line;

(b) continuously providing a predetermined minimum volume of a gas comprising oxygen and introducing the gas into the pipe system; and (c) delivering a desired constant quantity of the gas at each of the outlets by providing a moving element constant flow regulator means for each outlet which limits gas flow from each of the outlets to a constant amount when pressure in the pipe system exceeds a predetermined minimum value.

2. A method an claimed in claim 1 in which the predetermined minimum volume of gas exceeds a calculated minimum volume which is required to be delivered from the outlets.

3. A method as claimed in claim 1 in which substantially the same quantity of gas is delivered at each outlet irrespective of pressure drop along the pipe system.

4. A method as claimed in claim 1 in which gas pressure is kept substantially constant along the distribution line and each constant flow regulator means is a moving "0" ring constant flow regulator.

5. A method as claimed in claim 1, wherein the gas is air.

6. A mixing, aeration or oxygenating system to aerate or oxygenate ponds, rivers, or lakes, sewage or effluent treatment lagoons or beds or to airstrip volatile compounds from water or other solutes and comprising:

(a) a pipe system having a plurality of outlets branching from a gas distribution supply line;

(b) a source of pressurized gas comprising oxygen connected to the distribution supply line; and (c) an "O" ring moving element constant flow regulator for each outlet to cause a desired constant flow of gas to be delivered through the outlets when pressure in the pipe system exceeds a predetermined minimum value, each regulator in designed to only allow a desired maximum flow of gas to pass through at a known pressure of gas.

7. A system as claimed in claim 6 in which the source of pressurized gas in adapted to supply a predetermined minimum volume of gas, which volume is calculated to exceed a minimum volume which in to be delivered from all the outlets.

8. A system as claimed in claim 6 in which each regulator is tuned to deliver a desired calculated supply of gas required at each outlet irrespective of changes in supply pressure such that the regulator is self compensating for changes in supply pressure within a designed operating range of the regulator.

9. A system as claimed in claim 6 in which each outlet has a suitable outlet nozzle.

10. A system as claimed in claim 6 in which the outlets are disposed in series along the distribution supply line.

11. A system as claimed in claim 6 in which the source of pressurized gas is a pump which delivers a constant volume of gas.

12. A system as claimed in claim 6 in which the distribution supply line comprises at least one length of pipe.

13. A system as claimed in claim 6 in which the distribution supply line comprises a plurality of lengths of pipe branching from a common manifold.

14. A system as claimed in claim 6 in which the distribution supply line comprises a plurality of lengths of pipe having a direct connection with the source of pressurized gas.

15. A system as claimed in claim 6 in which the distribution supply line includes a return line.

16. A system as claimed in claim 6 in which the distribution supply line is of a ring main type.

17. A system as claimed in claim 6 in which the outlets incorporate a backflow regulation device and an isolation ball valve.

18. A system as claimed in claim 6 in which the outlets incorporate a backflow regulation device.

19. A system as claimed in claim 6 in which the outlets incorporate an isolation ball valve.

20. A system as claimed in claim 6, wherein the pressurized gas is air.

* * * * *